(12) United States Patent
Huang et al.

(10) Patent No.: US 7,976,221 B2
(45) Date of Patent: Jul. 12, 2011

(54) SYSTEM AND METHOD FOR IMPROVING LUBRICATION IN A FLUID DYNAMIC BEARING NEAR THE CONTACT REGION

(75) Inventors: Fu-Ying Huang, San Jose, CA (US); Jifang Tian, Fremont, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 599 days.

(21) Appl. No.: 11/787,904

(22) Filed: Apr. 17, 2007

(65) Prior Publication Data

US 2008/0260309 A1 Oct. 23, 2008

(51) Int. Cl.
*F16C 32/06* (2006.01)
(52) U.S. Cl. .................................... 384/107; 384/100
(58) Field of Classification Search ............ 384/100, 384/107, 110, 112–115, 119, 123, 132, 368, 384/420; 29/898.041; 360/99.08
See application file for complete search history.

(56) References Cited

U.S. PATENT DOCUMENTS

| | | | | |
|---|---|---|---|---|
| 3,439,962 A * | 4/1969 | Gothberg | | 384/107 |
| 5,707,154 A * | 1/1998 | Ichiyama | | 384/113 |
| 5,873,657 A * | 2/1999 | Lee | | 384/110 |
| 5,988,886 A * | 11/1999 | Takahashi | | 384/107 |
| 6,350,059 B1 * | 2/2002 | Takahashi | | 384/123 |
| 6,505,970 B2 * | 1/2003 | Takahashi et al. | | 384/123 |
| 6,554,476 B2 * | 4/2003 | Ishikawa et al. | | 29/898.041 |
| 7,102,851 B2 * | 9/2006 | Asada et al. | | 360/99.08 |
| 7,201,517 B2 * | 4/2007 | Gomyo et al. | | 384/112 |
| 7,237,956 B2 * | 7/2007 | Asada et al. | | 384/121 |
| 7,568,839 B2 * | 8/2009 | Gotoh et al. | | 384/107 |

FOREIGN PATENT DOCUMENTS

JP 2000346056 A * 12/2000
JP 2001295833 A * 10/2001

* cited by examiner

*Primary Examiner* — Marcus Charles (57) ABSTRACT

A system and method for improving lubrication in a fluid dynamic bearing are disclosed. A fluid dynamic bearing is formed. The fluid dynamic bearing comprises a shaft having an axis of rotation and a surface comprising a first groove at a first depth and a second groove at a second depth, wherein the first and second grooves are for supporting a film of lubricating fluid. The fluid dynamic bearing further includes a hub having an axis coincident to the axis of rotation and a complimentary surface juxtaposed to the shaft which is conducive to supporting the lubricating fluid such that the shaft is rotatably retained.

11 Claims, 6 Drawing Sheets

SYSTEM AND METHOD FOR IMPROVING LUBRICATION IN A FLUID DYNAMIC BEARING NEAR THE CONTACT REGION

TECHNICAL FIELD

This invention relates generally to the field of direct access storage devices and in particular to resolving boundary lubrication problems associated with start and stop of disk drives in addition to lubrication problems associated with shock.

BACKGROUND ART

Direct access storage devices (DASD) have become part of every day life, and as such, expectations and demands continually increase for greater speed for manipulating data and for holding larger amounts of data. To meet these demands for increased performance, the mechanical assembly in a DASD device, specifically the Hard Disk Drive (HDD) has undergone many changes.

A fluid dynamic bearing is the result of a thin layer of fluid, such as oil, moving between two juxtaposed surfaces and thus creating a barrier between the two surfaces that prevents their contact. Methods have been varied for moving the fluid to generate the FDB. One early method of moving the fluid was to use a pump that was external to the juxtaposed surfaces. This is costly for HDD application.

One problem is that at start and stop of the HDD and during device shock conditions, metal surfaces may contact, leading to accelerated wear. This contact leads to particulate contamination of the lubrication fluid and greatly decreases the life of HDD components.

SUMMARY OF THE INVENTION

A system and method for improving lubrication in a fluid dynamic bearing are described herein. One embodiment of the invention includes a fluid dynamic bearing comprising a shaft having an axis of rotation and a surface comprising a first groove at a first depth and a second groove at a second depth, wherein the first and second grooves are for supporting a film of lubricating fluid. The fluid dynamic bearing further includes a hub having an axis coincident to the axis of rotation and a complimentary surface juxtaposed to the shaft which is conducive to supporting the lubricating fluid such that the shaft is rotatably retained.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to the alternative embodiment(s) of the present invention. While the invention will be described in conjunction with the alternative embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

The discussion will begin with an overview of a hard disk drive and components connected therewith. The discussion will then focus on embodiments of a system and method for improving lubrication in an FDB. Although the FDB is shown in a hard disk drive, it is understood that the embodiments described herein are useful in an FDB regardless of whether or not the FDB is a portion of a hard disk drive. The utilization of the FDB within the HDD is only one embodiment and is provided herein merely for purposes of brevity and clarity.

Disk drive fluid bearing spindle motors, especially higher performance motors for server drives operating at 10,000 or more RPMs, place severe demands on less than 10 mg of oil. An oil film approximately 10 microns or less in thickness is sandwiched between the rotor and the stator. Bearing stiffness is provided by a groove pattern on one of the surfaces. Vector components of the pressure are engineered to provide both radial and axial stiffness during operation at full design speed.

Embodiments of the present technology include grooves with different depths to improve lubrication of the fluid dynamic bearing. In one embodiment, a first groove at a first (shallow) depth is for lubricating during starting and stopping conditions of the FBD and for lubricating during shock conditions associated with the FDB. A second groove (deeper than the first groove) lubricates the FDB during normal operating conditions. The first groove enables fast take-off on start-up and prevents metal on metal contact during shock conditions. The shallower grooves can increase the FDB load capacity in the near-contact region when FDB clearance becomes less. Therefore, embodiments of the present invention can make spindle takeoff quicker and provide a larger FDB force to sustain a shock event.

Many times, the only time that metal surfaces are in the boundary lubrication regime is briefly during start and stop operation. Boundary lubrication is when the thickness of the lubrication fluid approximates the surface roughness of one or more of the surfaces. For example, suppose the surface roughness of one metal surface is approximately 0.2 microns. Boundary lubrication occurs when the lubrication fluid approaches 0.2 microns in thickness. Embodiments of the present invention reduce the time the FDB is in boundary conditions because the shallower groove decreases take-off time.

During operation at normal temperatures, adequate safety margins are built into the design so that even within the outer limits of manufacturing tolerances, the clearance between the rotating metal surfaces exceeds the maximum surface asperity height. In one embodiment of the invention, the deeper groove provides lubrication during normal operating conditions.

Embodiments of the present invention improve motor reliability by incorporating a shallow groove to lubricate during start, stop and shock conditions and a deeper groove to lubricate during normal operating conditions. Embodiments of the present invention reduce wearing of the FDB and provide improved lubrication during shock and/or boundary conditions. The present invention is well suited to many components of a fluid dynamic bearing including journal bearings, thrust bearings and conical bearings of a fluid dynamic bearing. In one embodiment, the shallower groove is between 4-8 microns deep with respect to the bearing surface and the deeper groove is between 9-15 microns deep with respect to the bearing surface.

Physical Description

Figure 1A:
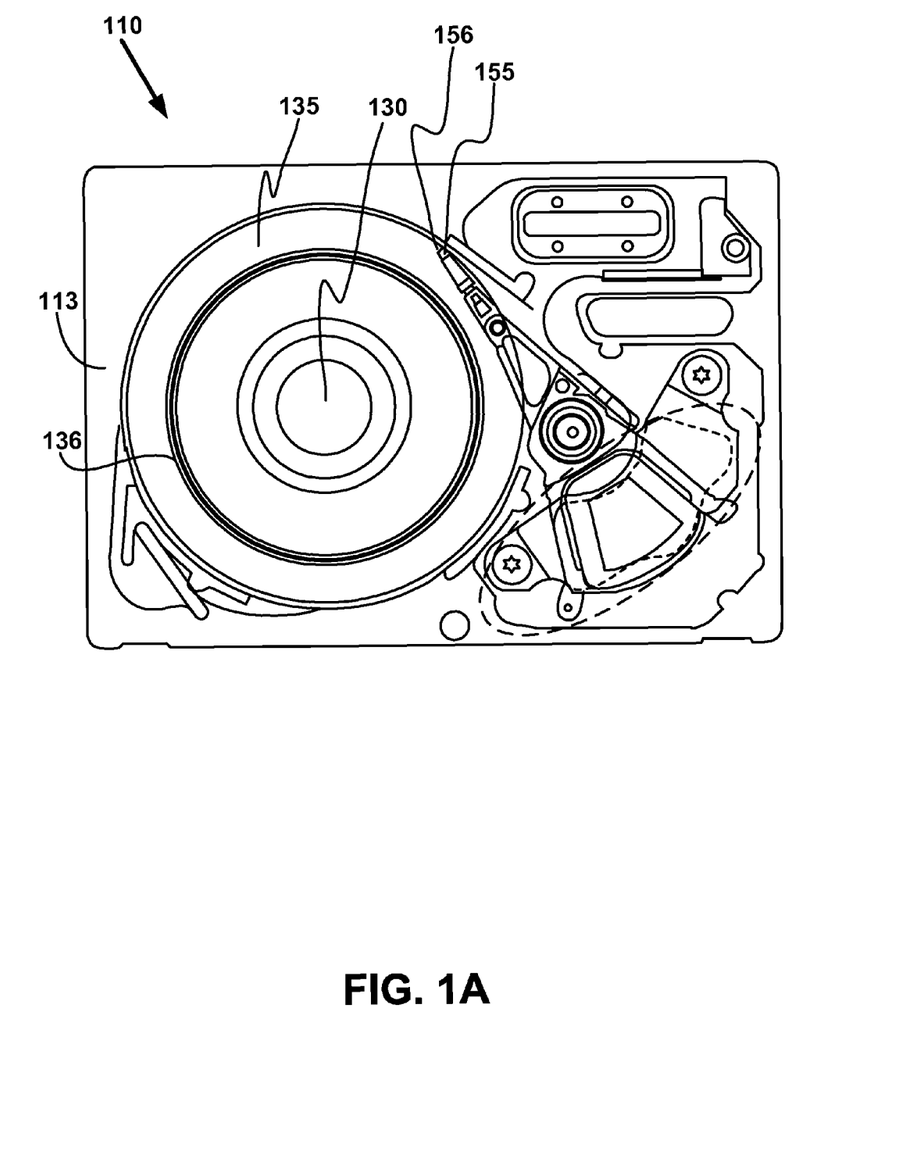
FIG. 1A is a plan view of an HDD with cover and top magnet removed in accordance with one embodiment of the present invention.
Figure 1B:
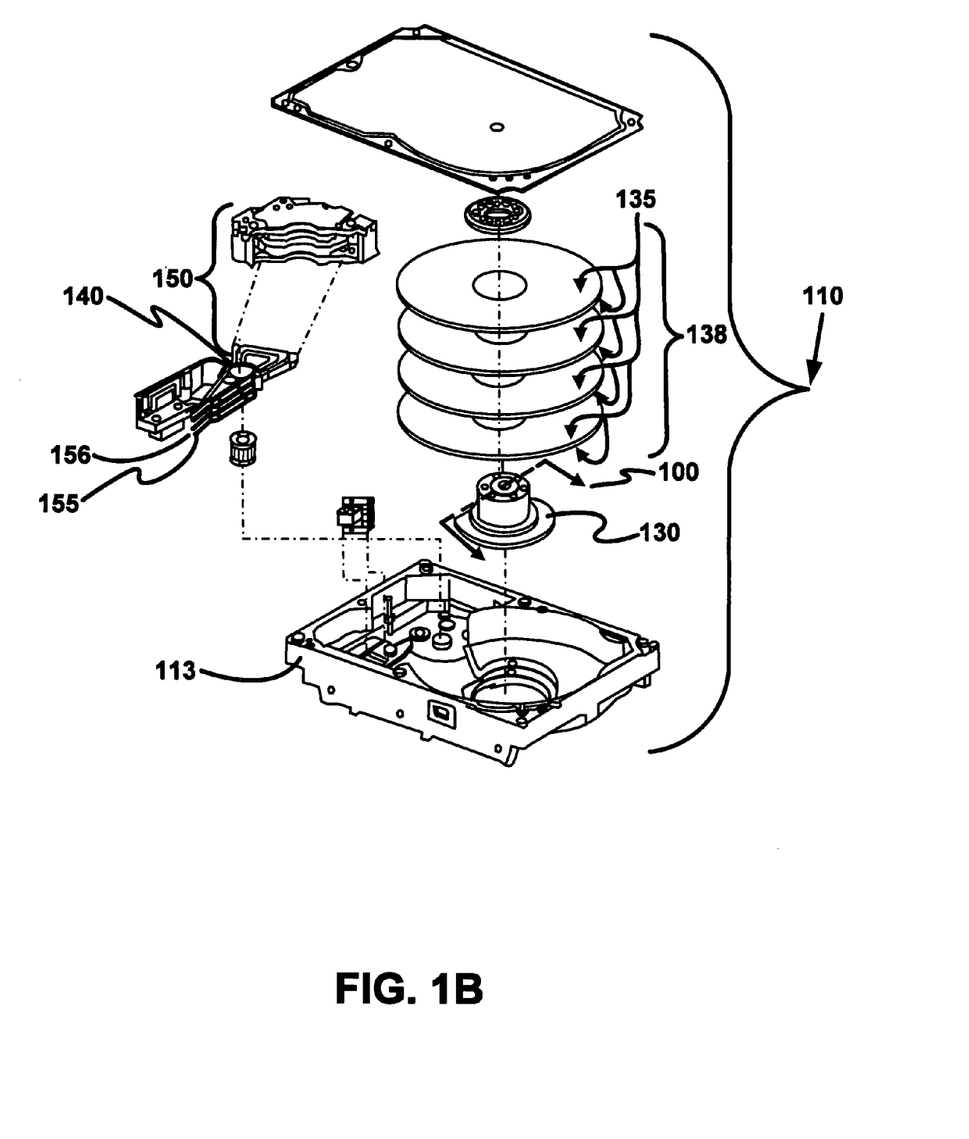
FIG. 1B is an isometric blow-apart of an HDD in accordance with one embodiment of the present invention.

Referring now to FIG. 1A a relationship of components and sub-assemblies of a hard disk drive (HDD) 110 and a representation of data tracks 136 recorded on disk surface 135 is shown. For purposes of clarity, the cover is removed and not shown so that the inside of HDD 110 is visible. FIG. 1B shows a similar HDD 110, but with all its components in an isometric blow-apart view. The components are assembled into base casting 113, which provides attachment and registration points for components and sub-assemblies. Data is recorded onto disk surface 135 in a pattern of concentric rings known as data tracks 136. Disk surface 135 is spun at high speed by means of a motor-hub assembly 130. Data tracks 136 are recorded onto disk surface 135 by means of magnetic head 156, which typically resides at the end of slider 155. FIG. 1A being a plan view shows only one head and one disk surface combination. One skilled in the art understands that what is described for one head-disk combination applies to multiple head-disk combinations. The embodied invention is independent of the number of head-disk combinations.

The dynamic performance of HDD 110 is a major mechanical factor for achieving higher data capacity as well as for manipulating this data faster. The quantity of data tracks 136 recorded on disk surface 135 is determined partly by how well magnetic head 156 and a desired data track 136 can be positioned to each other and made to follow each other in a stable and controlled manner. There are many factors that will influence the ability of HDD 110 to perform the function of positioning magnetic head 156, and following data track 136 with magnetic head 156. In general, these factors can be put into two categories; those factors that influence the motion of magnetic head 156; and those factors that influence the motion of data track 136. Undesirable motions can come about through unwanted vibration and undesirable tolerances of components. Herein, attention is given to motor-hub assembly 130, which attaches to base casting 113, and in particular, attention is given to the fluid dynamic bearing inside motor-hub assembly 130.

Figure 2:
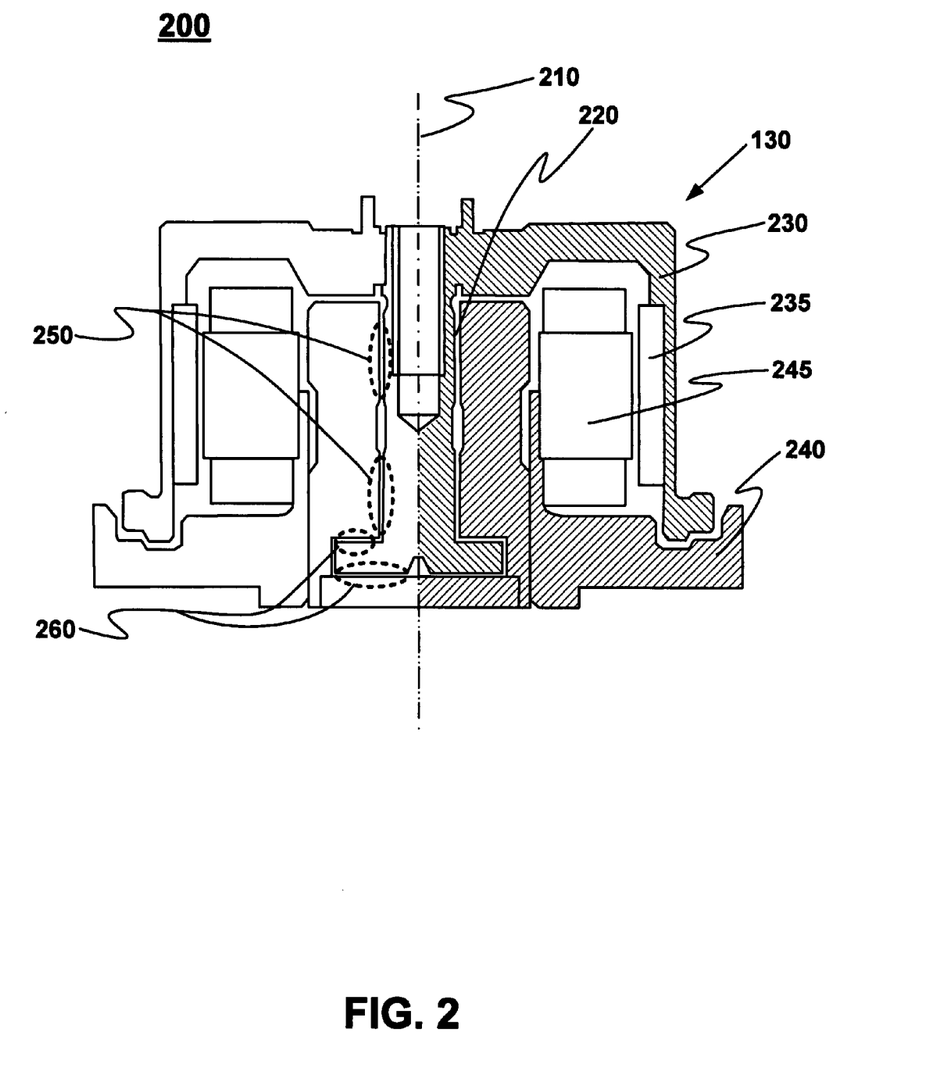
FIG. 2 is a cross-section view of motor-hub assembly in accordance with one embodiment of the present invention.

With reference now to FIGS. 1B and 2, a cross-section view 200 of motor-hub assembly 130 is shown in accordance with one embodiment of the present invention. In general, motor-hub assembly 130 supports disk stack 138 so that disk surface 135 can be spun adjacent to slider 155 and thus allow magnetic head 156 to read and write data tracks 136 on disk surface 135.

A cross-section view 200 in FIG. 2, taken along section line 100 (FIG. 1B) reveals the inside structure of motor-hub assembly 130 and the FDB. For clarity, only half of cross-section view 200 is crosshatched. Several components are joined together to form rotor (e.g., shaft) 230 and stator (e.g., hub) 240. Motor magnet 235, which is coupled to rotor (shaft) 230 and motor winding 245, which is coupled to stator (hub) 240 are not crosshatched for clarity, but are considered to be parts of rotor 230 and stator 240. Gap 220 between rotor 230 and stator 240 is also not crosshatched. It should be appreciated that features shown in cross-section 200 are circular and symmetric about axis 210. Therefore, a feature shown or highlighted in cross-section 200 on one side of axis 210 is the same feature on the other side of axis 210.

Referring to FIG. 2, axis 210 is an axis of symmetry as well as the axis of rotation for motor-hub assembly 130 and disk pack 138. Since rotor 230 and stator 240 are the major structural components of motor-hub assembly 130, rotor 230 and stator 240 also share the same axes of symmetry and are coincident with axis 210. Rotor 230 is retained by its geometry to rotate about stator 240. It is appreciated that for purposes of brevity and clarity, the rotor is described as a "shaft" and the stator is described as a "hub." It is appreciated that embodiments of the present technology can be used for any surfaces of the fluid dynamic bearing that is designed to be lubricated.

Gap 220 is comprised of the outer surface of rotor 230 and the inner surface of stator 240. Four zones of gap 220 are highlighted in FIG. 2. Two are denoted as zones 250, and two zones are denoted as zones 260. Zones 250 produce radial stiffness for the FDB. Zones 260 produce axial stiffness for the FDB. Each surface is patterned in such a manner as to be conducive to supporting a film of fluid and to impart movement to this fluid, which is placed in gap 220. For example, in one embodiment, the surface is patterned with grooves of differing depths. A first groove depth is for lubricating the surface during start, stop and shock conditions. The second groove is at a depth deeper than the first groove. The deeper groove is for lubricating the surface during normal operating conditions.

The moving fluid produces a film that is resistant to collapsing and hence prevents juxtaposed surfaces from coming in contact. This film couples rotor 230 to stator 240 such that rotor 230 maintains a constant separation (gap 220) from stator 240 while allowing rotor 230 to rotate freely. In accordance with embodiments of the present invention, the HDD is considered to be in boundary lubrication when the gap 220 approaches the roughness (not shown) of one or more of the surfaces forming the gap 220. In one embodiment, the shallower grooves improve "take-off" time during start conditions, which reduces the time the FDB is in boundary conditions.

Figure 3:
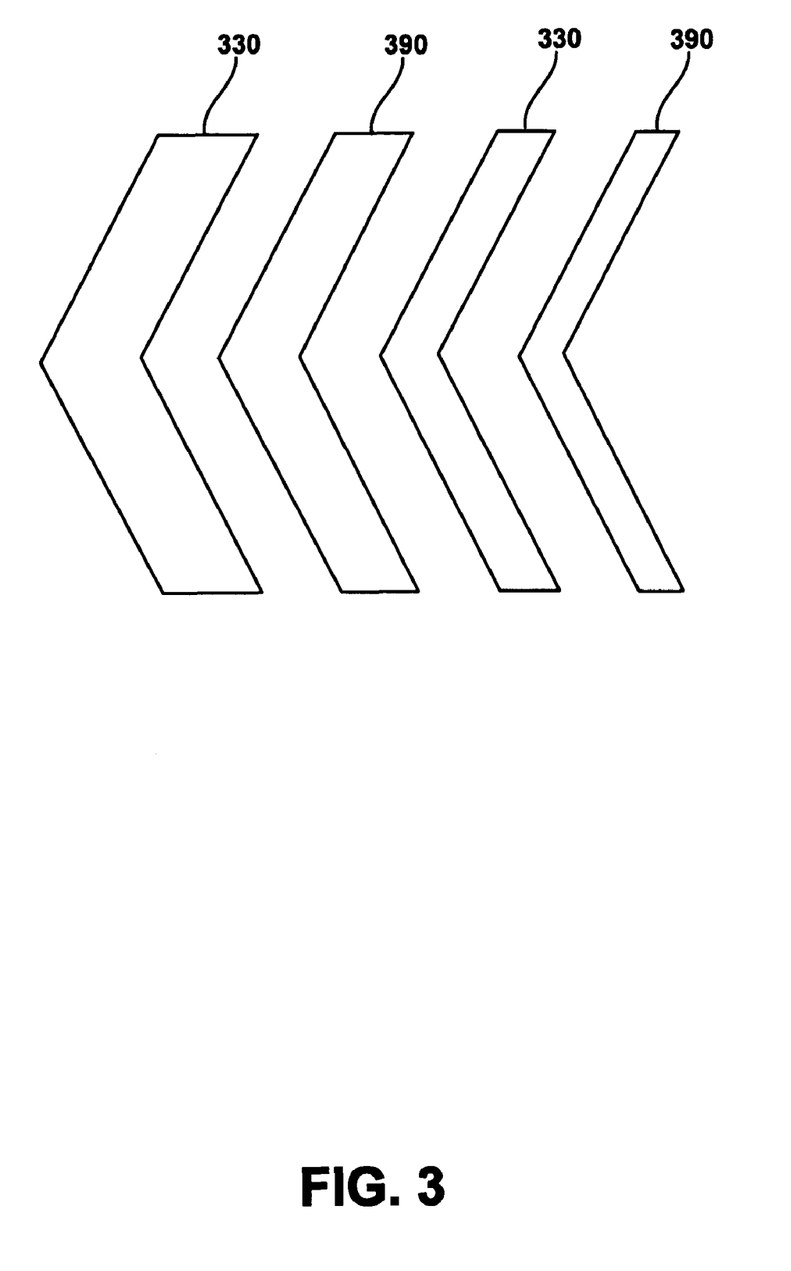
FIG. 3 is an exemplary herringbone groove pattern in accordance with one embodiment of the present invention.

With reference now to FIG. 3, a herringbone pattern fabricated into a surface in gap 220 is shown in accordance with an embodiment of the present invention. In general, herringbone pattern 300 is a series of grooves that are fabricated into a surface in gap 220 at zones 250. Typically herringbone pattern 300 is fabricated onto the outer surface of rotor 230 in zones 250, and the juxtaposed surface of stator 240 is a polished surface. As stated above, the shallower groove is between 4-8 microns deep with respect to the bearing surface and the deeper groove is between 9-15 microns deep with respect to the bearing surface.

Embodiments of this invention are not dependent upon which surface contains herringbone pattern 300 or whether both surfaces contain herringbone pattern 300. In one embodiment, the pattern 300 includes grooves at different depths. For example, the pattern 300 includes grooves at depths 330 and 390. One of the grooves, 330 or 390 is deeper than the other groove. The shallower groove is designed to improve lubrication at start, stop and shock conditions while the deeper groove is designed to improve lubrication at normal operating conditions. As stated above, the shallower groove is between 4-8 microns deep with respect to the bearing surface and the deeper groove is between 9-15 microns deep with respect to the bearing surface. However, it is appreciated that the depths of the grooves could be dependent on many characteristics of the FDB and could differ from the ranges provided herein.

Figure 4:
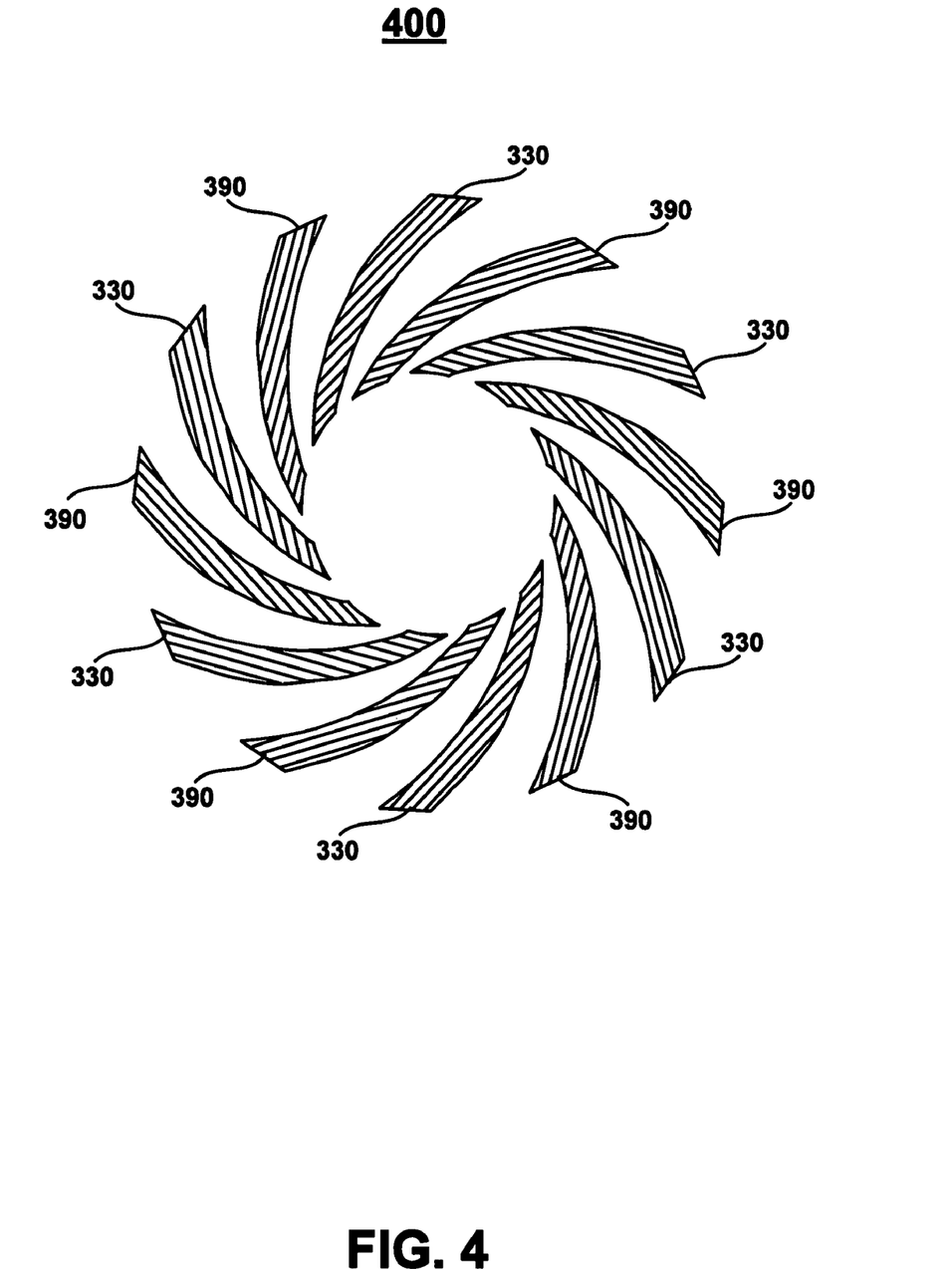
FIG. 4 is an exemplary spiral groove pattern in accordance with one embodiment of the present invention.

Referring now to FIG. 4, a spiral pattern fabricated into a surface in gap 220 is shown in accordance with an embodiment of the present invention. In general, spiral pattern 400 is a series of grooves that are fabricated into a surface in gap 220 at zones 260. Spiral pattern 400 is fabricated onto either the surface of rotor 230 or the surface of stator 240 in zones 250, or onto both the surface of rotor 230 and the surface of stator 240 in zones 250. One juxtaposed surface in zone 260 is typically a polished surface. Embodiments of this invention are not dependent upon which surface contains spiral pattern 400 or a polished surface. As stated above, the pattern 400 includes grooves at different depths. For example, the pattern 300 includes grooves at depths 330 and 390. One of the grooves, 330 or 390 is deeper than the other groove. The shallower groove is designed to improve lubrication at start, stop and shock conditions while the deeper groove is designed to improve lubrication at normal operating conditions. The shallower grooves can increase the FDB load capacity in the near-contact region when FDB clearance becomes less. Therefore, embodiments of the present invention can make spindle takeoff quicker and provide a larger FDB force to sustain a shock event.

Operation

It should be appreciated from FIGS. 2, 3, and 4 that rotor (e.g., shaft) 230 and stator (e.g., hub) 240 require skill and clever technology to fabricate. The metal chosen to fabricate the components that comprise rotor 230 and stator 240 are chosen for their ease of machinability; their adaptability to fabrication technologies; and suitability for application in an FDB. A metal of choice has been bronze. Brass is also another metal of choice for fabricating the intricate herringbone pattern 300 and spiral pattern 400. These metals are categorized as yellow metal because of their yellow color. Any metal that contains copper as its major element is classified as yellow metal.

The moving fluid that comprises the fluid dynamic bearing is also a lubricating fluid or oil. The lubricating properties of the moving fluid are required for the occasion of contact between the juxtaposed surfaces of rotor 230 and stator 240. Contact occurs primarily upon start and stop of rotation of motor-hub assembly 130. At the operating condition of starting, the fluid in gap 220 is not moving and has not established the FDB. At the operating condition of stopping, the moving fluid in gap 220 ceases to move and the FDB is no longer established. However, embodiments of the present invention use a shallow groove depth to reduce the start-up time of the FDB, thus reducing wear.

Figure 5:
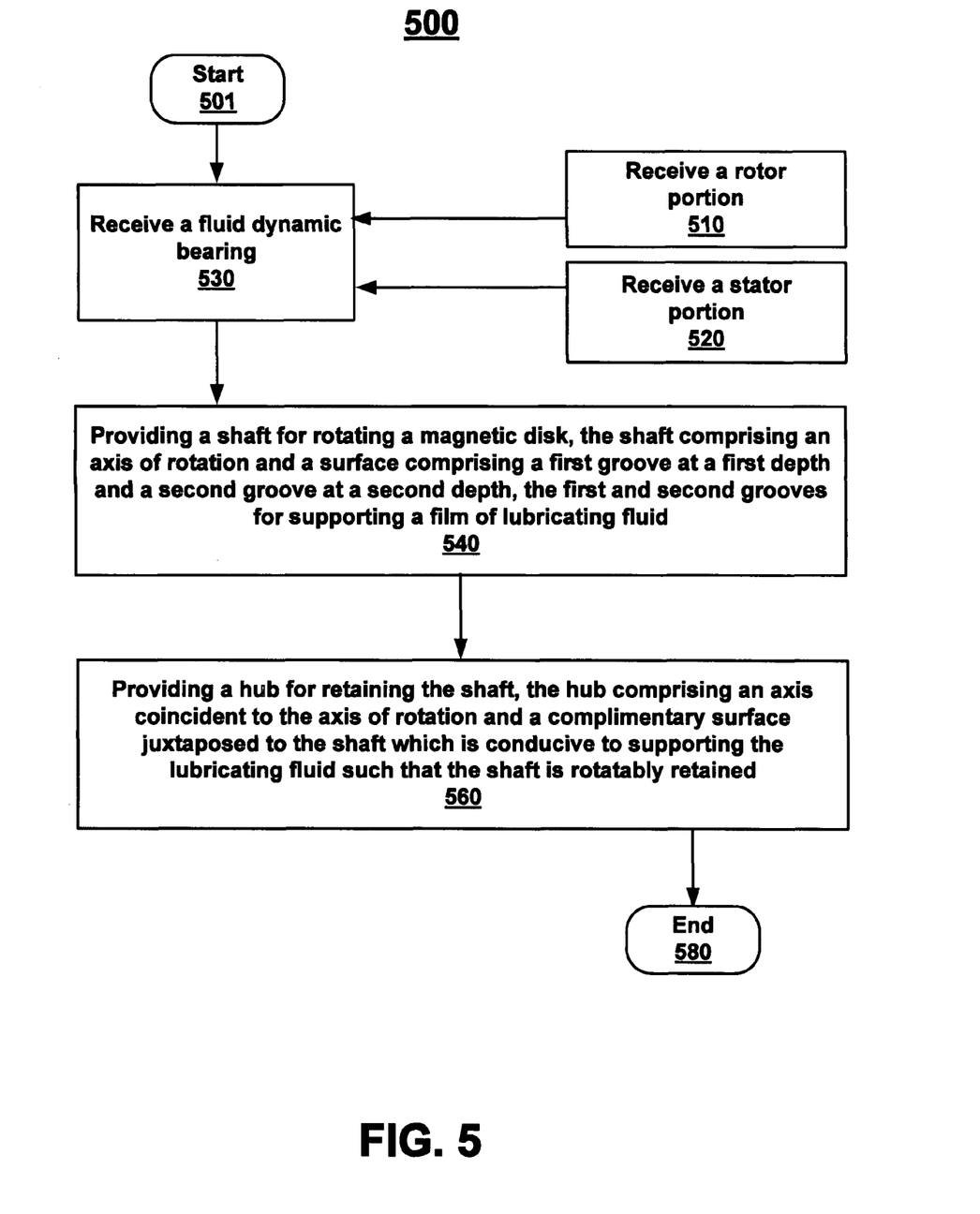
FIG. 5 is a flow chart illustrating the steps of a method for improving high pressure lubrication in a fluid dynamic bearing in accordance with one embodiment of the present invention.

FIG. 5 is a flow chart of a process 500 in which particular steps are performed in accordance with an embodiment of the present invention for improving lubrication in a fluid dynamic bearing, including providing a plurality of lubrication grooves at different depths. FIG. 5 includes processes of the present invention, which in one embodiment, are carried out by processors, electrical components and assembly mechanisms under the control of computer readable and computer executable instructions. The computer readable and computer executable instructions reside, for example, in data storage features such as a computer usable volatile memory and/or a computer usable non-volatile memory and/or a data storage device. However, the computer readable and computer executable instructions may reside in any type of computer readable medium. Although specific steps are disclosed in process 500, such steps are exemplary. That is, the present invention is well suited to performing various other steps or variations of the steps recited in FIG. 5. Within the present embodiment, it should be appreciated that the steps of process 500 may be performed by software, by hardware, by an assembly mechanism, through human interaction, or by any combination of software, hardware, assembly mechanism, and human interaction.

At 501 of process 500, the process for improving lubrication in a fluid dynamic bearing is initiated in an embodiment in accordance with the present invention.

At 510 of process 500, a rotor (e.g., shaft) portion is received and introduced to the fluid dynamic bearing in an embodiment in accordance with the present invention.

At 520 of process 500, a stator (e.g., hub) portion is received and introduced to the fluid dynamic bearing in an embodiment in accordance with the present invention.

At 530 of process 500, the fluid dynamic bearing is received in an embodiment in accordance with the present invention.

At 540 of process 500, a shaft for rotating a magnetic disk is provided wherein the shaft comprising an axis of rotation and a surface comprising a first groove at a first depth and a second groove at a second depth, the first and second grooves for supporting a film of lubricating fluid.

At 560 of process 500 a hub for retaining the shaft is provided wherein the hub comprises an axis coincident to the axis of rotation and a complimentary surface juxtaposed to the shaft which is conducive to supporting the lubricating fluid such that the shaft is rotatably retained At 580 of process 500, the process ends. The end result of process 500 is improving lubrication in a fluid dynamic bearing especially during boundary lubrication (e.g., start stop and shock operations) in an embodiment in accordance with the present invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A fluid dynamic bearing comprising:
   a shaft having;
      an axis of rotation; and
      a surface comprising grooves of only two different depths, a first groove depth and a second groove depth, said grooves for supporting a film of lubricating fluid, said first groove depth deeper than said second groove depth; and
   a hub having;
      an axis coincident to said axis of rotation; and
      a complimentary surface juxtaposed to said shaft which is conducive to supporting said lubricating fluid such that said shaft is rotatably retained.

2. The fluid dynamic bearing of claim 1 wherein said first groove depth is for supporting said film of lubricating fluid at normal operating conditions of said fluid dynamic bearing.

3. The fluid dynamic bearing of claim 1 wherein said second groove depth is for supporting said film of lubricating fluid at starting and stopping of said fluid dynamic bearing.

4. The fluid dynamic bearing of claim 1 wherein said second groove depth is for supporting said film of lubricating fluid at shock conditions associated with said fluid dynamic bearing.

5. The fluid dynamic bearing of claim 1 wherein said first groove depth is between 5 and 7 microns in depth and said second groove depth is between 9 and 15 microns in depth.

6. The fluid dynamic bearing of claim 1 wherein said shaft includes a thrust bearing surface, said thrust bearing surface comprising grooves of only two different depths.

7. The fluid dynamic bearing of claim 1 wherein said shaft includes a journal bearing surface, said journal bearing surface comprising grooves of only two different depths.

8. A method for improving lubrication in a fluid dynamic bearing for hard disk drive systems comprising:
   providing a shaft for rotating a magnetic disk, said shaft comprising;
   an axis of rotation; and
   a surface comprising grooves of only two different depths, a first groove depth and a second groove depth, said grooves for supporting a film of lubricating fluid wherein said first groove depth is deeper than said second groove depth; and
   providing a hub for retaining said shaft, said hub comprising;
   an axis coincident to said axis of rotation; and
   a complimentary surface juxtaposed to said shaft which is conducive to supporting said lubricating fluid such that said shaft is rotatably retained.

9. The method of claim 8 wherein said first groove depth is for supporting said film of lubricating fluid at normal operating conditions of said hard disk drive.

10. The method of claim 8 wherein said second groove depth is for supporting said film of lubricating fluid at starting and stopping of said hard disk drive.

11. The method of claim 8 wherein said second groove depth is for supporting said film of lubricating fluid at shock conditions associated with said hard disk drive.

* * * * *